(12) United States Patent
Adiga

(10) Patent No.: US 8,151,177 B2
(45) Date of Patent: Apr. 3, 2012

(54) METHODS AND ARRANGEMENTS FOR PARTIAL WORD STORES IN NETWORKING ADAPTERS

(75) Inventor: Narasimha Ramakrishna Adiga, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 11/946,492

(22) Filed: Nov. 28, 2007

(65) Prior Publication Data

US 2009/0138787 A1    May 28, 2009

(51) Int. Cl.
*H03M 13/05* (2006.01)
*G06F 11/10* (2006.01)

(52) U.S. Cl. .................................................. 714/807
(58) Field of Classification Search .................. 714/758, 714/807
See application file for complete search history.

(56) References Cited

U.S. PATENT DOCUMENTS

| 5,430,842 | A | 7/1995 | Thompson et al. | |
|---|---|---|---|---|
| 5,491,802 | A | 2/1996 | Thompson et al. | |
| 5,898,713 | A | 4/1999 | Melzer et al. | |
| 6,728,929 | B1 * | 4/2004 | Luong | 714/807 |
| 6,964,008 | B1 * | 11/2005 | Van Meter, III | 714/807 |
| 7,028,249 | B2 * | 4/2006 | Bruekers et al. | 714/807 |
| 7,043,677 | B1 * | 5/2006 | Li | 714/758 |
| 7,415,652 | B1 * | 8/2008 | Szeremi | 714/758 |
| 7,555,693 | B2 * | 6/2009 | Altmann | 714/746 |

FOREIGN PATENT DOCUMENTS

EP        1408417 A1        4/2004

* cited by examiner

*Primary Examiner* — James C Kerveros
(74) *Attorney, Agent, or Firm* — Roy W. Truelson

(57) ABSTRACT

A method and arrangement for the implementation of a simple algorithm to store an N-bit checksum into any unaligned position within a larger NxP-bit word, which avoids the use of a logic-intensive implementation that employs a bank of demultiplexers, or a latency-increasing approach of "read-modify-write".

14 Claims, 2 Drawing Sheets

METHODS AND ARRANGEMENTS FOR PARTIAL WORD STORES IN NETWORKING ADAPTERS

FIELD OF THE INVENTION

The present invention relates generally to methods and arrangements for effecting partial word stores in networking adapters, and particularly to the disposition of such a task with less delay and which is capable of working at faster frequencies.

BACKGROUND OF THE INVENTION

Typically, in designs for networking adapters, challenges are encountered where a partial word (e.g., 16 bit of IP checksum) has to be inserted into packets in buffers that are typically aligned to bus widths (e.g., 64 bit as in the case of 8×PCI Express interface; an example of such an interface can be found at www.pcisig.com, PCI Express Base spec. Rev 1.0a). In fact, this is frequently required in hardware logic that implements a "checksum offload" feature. In many conventional designs (e.g., U.S. Pat. No. 5,898,713, "IP Checksum Offload", Melzer et al., wherein IP checksum computation is offloaded to a control unit to reduce processor cycles consumed by the host, thereby improving the performance of the host computer and network), the hardware logic is required to insert the partial word into any specified offset into the packet; this insert position in the buffers could be odd or even.

A conventional method for undertaking such a partial word write involves using a shifter that employs 16 1:8 demultiplexers with lower order 3 bits of the offset (i.e., the least significant 3 bits of the specified checksum position within the packet, e.g., chksum_pos(2:0)) acting as the "select" lines which determine the amount of shift. The rest of the higher order bits of the offset act as an address into the buffer being written with byte enables. One problem with this method is that it is highly logic-intensive and also reduces the frequency of operation, since demultiplexers are inserted right in the critical data path. Further, in the absence of byte enable at the buffer interface, the design will require a read-modify-store approach; this will further increase the latency.

Another key drawback of the above-noted conventional approach is that in case the checksum has to be inserted at the buffer word boundary (e.g. checksum Position=7), the word to be written in the packet buffer has to be computed separately (i.e., the lower checksum byte is written at byte 7 at a word address, and in the next cycle the upper checksum byte is written at byte 0 of the next word address). Accordingly, the logic needs a separate multiplexer to select data for these two write cycles.

High Performance Computing (HPC) networking adapters which currently exist tend to require hardware to perform operations with low latency, and with less consumption of logic cells at high frequency. Such optimization is particularly important for FPGA implementation, where a frequency of operation of 250 MHz is typical for supporting support high throughput requirements of a GigaEthernet interface. Simply, conventional arrangements in the mold discussed above are not adequate to respond to such demands. Accordingly, a strong and compelling need has been recognized in connection with improving upon the performance of conventional arrangements and implementing a system that can meet demands of the type just described.

SUMMARY OF THE INVENTION

Broadly contemplated herein, in accordance with at least one presently preferred embodiment of the invention, is the implementation of a simple algorithm to store 2 Bit IP checksum into any unaligned position within an 8 Bit word. This avoids the use of a logic-intensive implementation that employs 16 1:8 demultiplexers, or a latency-increasing approach of "read-modify-write".

In summary, one aspect of the invention provides a method of effecting a partial word store in a networking adapter, said method comprising the steps of: accepting a main data packet; conveying the main data packet towards a packet buffer and a checksum adder; conveying a checksum packet from the checksum adder to a single multiplexer; and conveying a checksum word from the single multiplexer towards the packet buffer.

A further aspect of the invention provides a system for effecting a partial word store in a networking adapter, said system comprising: a checksum adder for accepting a main data packet; a single multiplexer; and a packet buffer; said checksum adder acting to convey a checksum packet to said single multiplexer; said single multiplexer acting to convey a checksum word towards said packet buffer.

Furthermore, an additional aspect of the invention provides a program storage device readable by machine, tangibly embodying a program of instructions executable by the machine to perform a method comprising the steps of: accepting a main data packet; conveying the main data packet towards a packet buffer and a checksum adder; conveying a checksum packet from the checksum adder to a single multiplexer; and conveying a checksum word from the single multiplexer towards the packet buffer.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
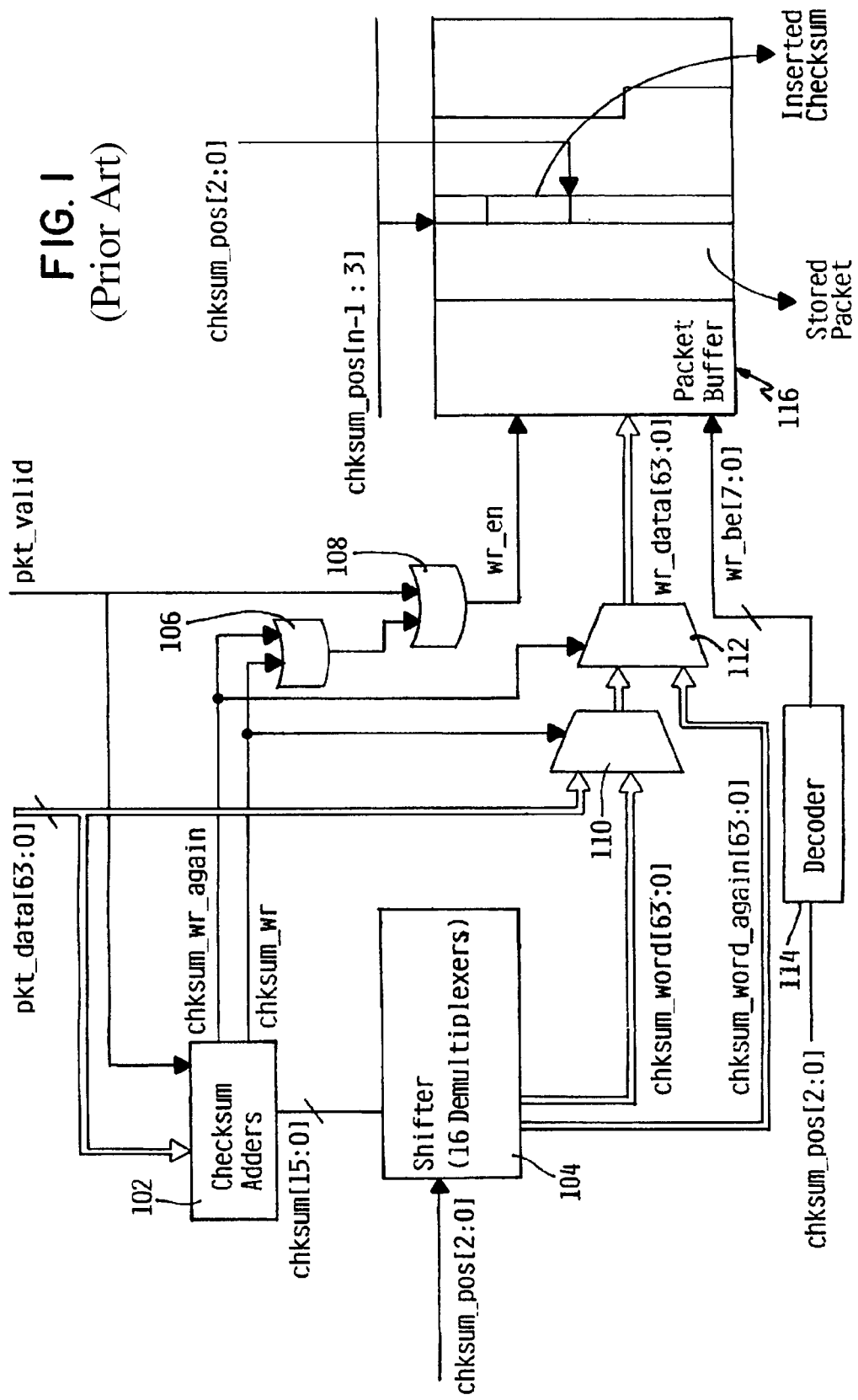
FIG. 1 schematically illustrates a conventional arrangement for effecting a partial word store.
Figure 2:
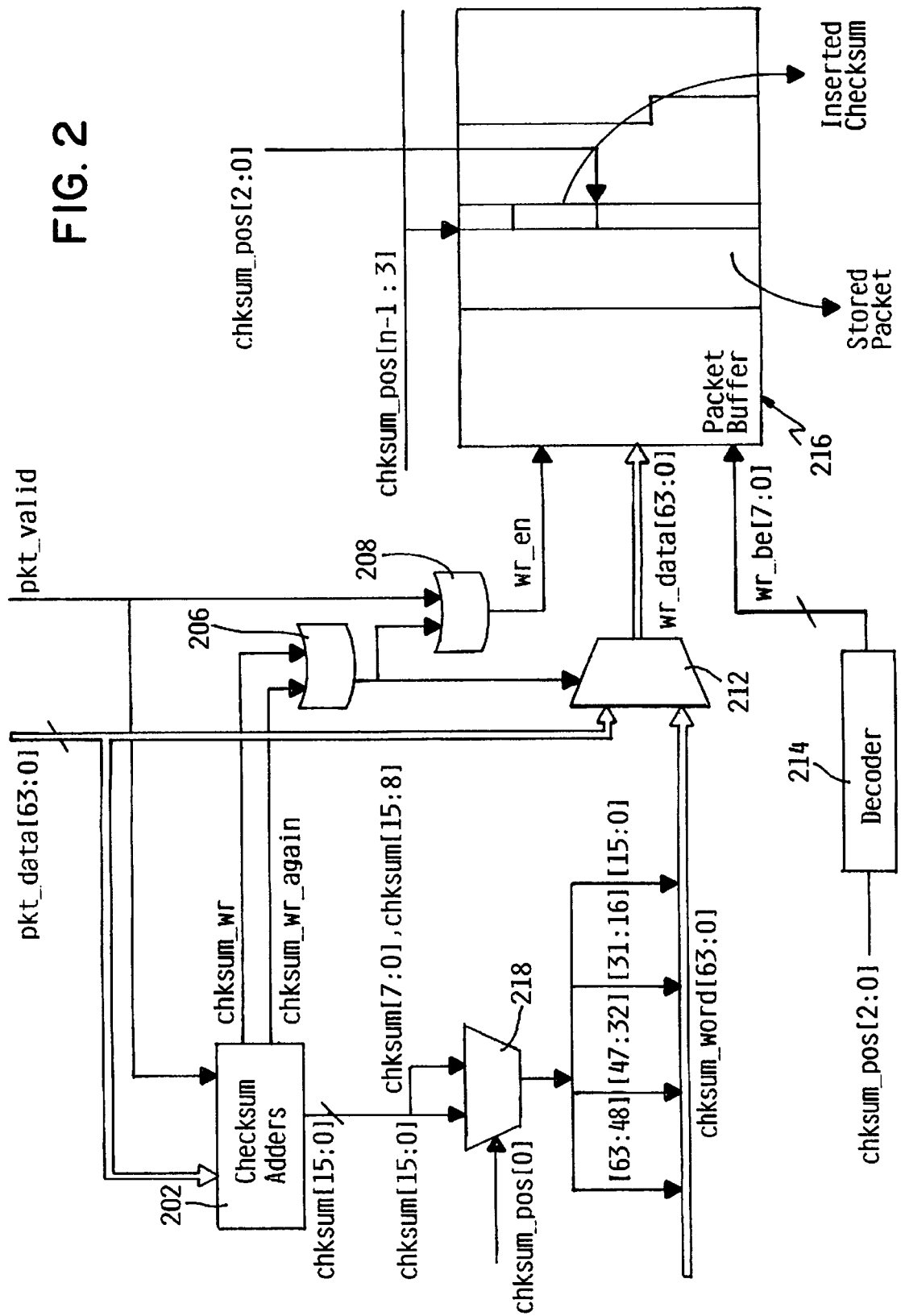
FIG. 2 schematically illustrates an arrangement in accordance with a preferred embodiment of the present invention.

FIG. 1 illustrates a conventional arrangement of the type described further above. Shown is checksum adder 102 and, indicated at 104, the aforementioned shifter employing 16 1:8 demultiplexers.

As is conventionally known, inputs into a packet buffer 116 originate from two gates 108/112, and a decoder 114, now to be more fully appreciated. By way of an illustrative and non-restrictive example (which provides a point of comparison with the inventive arrangement shown in FIG. 2), a main data packet "pkt_data [63:0]", or 63 bits of a 64-bit packet, and a single bit "pkt_valid" (for validation purposes as known) are fed to two destinations each, the former to adder 102 and a gate 110, and the latter to adder 102 and gate 108. Gates 110 and 112 are shown here as 2:1 Multiplexers, while gates 106 and 108 are shown here as OR gates. When the main data packet is received, adder 102 generates chksum_wr and, if the checksum position (chksum_pos) is on a word boundary, chksum_wr_again. As shown, chksum_wr is fed both to gate 110 and another gate 106, while chksum_wr_again is fed to gate 106 and gate 112.

As shown, shifter 104 receives chksum [15:0] from adder 102 as well as the packet chksum_pos [2:0], an input indicating the checksum position. Outputs from shifter 104 include chksum_word [63:0] and chksum_word_again [63:0]; these are fed, respectively, to gates 110 and 112. The full combined output of gate 110 proceeds to gate 112, and the full combined output of gate 112 proceeds to packet buffer 116.

As further shown, decoder 114 receives the packet chksum_pos [2:0] and generates wr_be[7:0] to be input into packet buffer 116. It should be noted that when chksum_wr_again is asserted, the wr_be [7:0] generated by the decoder will be x"01". The address of chksum_write in this case is chksum_pos [n-1:3]+1. i.e. the next word in the packet. It should further be noted that the chksum_word_again [63:0] will have chksum [15:8] as its least significant byte, that is:

chksum_word_again [7:0]=chksum [15:8]

chksum_word_again [63:8]=don't care (i.e., the byte enables of these bytes will be zeroes; accordingly, they are not written into the packet buffer, and their values are of no practical significance)

Further, it will be noted that chksum_word [63:0] is formed by shifting left chksum [15:0]. Thus, for example if (as shown) chksum_pos [2:0] is 0, then:

chksum_word [63:0]=x"000000000000" & chksum[15:0],

. . . 1; chksum_word [63:0]=x"0000000000" & chksum [15:0] & x"00", . . .

. . . 6; chksum_word [63:0]=chksum[15:0] & x"000000000000"

. . . 7; chksum_word [63:0]=chksum[7:0] & "00000000000000"

In contrast, FIG. 2 schematically illustrates an arrangement in accordance with a preferred embodiment of the present invention. For the purposes of clear comparison and illustration, mostly those aspects which differ with respect to FIG. 1 will be discussed. Components in FIG. 2 that are similar or analogous to those presented in FIG. 1 bear reference numerals advanced by 100. A fundamental difference is the lack of a shifter of the type discussed above (and indicated at 104 in FIG. 1).

Accordingly, an "adapter" implementation in accordance with a preferred embodiment of the present invention involves IP/TCP/UDP packets streaming into the packet buffer 216 directly from the host 8x PCI Express bus (where pkt_data (63:0) is shown). In this way, 8 B bytes of packet can be written into the packet buffer 216 in every cycle. Preferably, the hardware will implement "checksum offload" upon adding and accumulating every 2 bytes of adjacent packet data. Preferably, an "end around carry" is employed. In an "end around carry", checksum is accumulated over the entire packet length by following action: checksum(17:0)=checksum(15:0)+checksum(17:16)+pkt_data(15:0)+pkt_data(31:16)+pkt_data(47:32)+pkt_data(63:48); the resultant checksum is obtained from checksum(15:0), which will have "carry out" (i.e. checksum(17:16)) added to it. Preferably, once the entire packet is received by the adapter (at the pkt_data(63:0), qualified by pkt_valid) and stored in the packet buffer 216, it inserts the computed 2 Byte IP checksum into the packet buffer 216 at an offset specified as chksum_pos[n-1:0].

Preferably, an approach in accordance with at least one embodiment of the present invention will use the least significant bit of the checksum position (chksum_pos[0]) to which the checksum is to be stored to select between the computed checksum or the byte swapped value of the checksum, i.e., implement a multiplexer 218 which has checksum (e.g., x1234) as one of its inputs and byte-swapped checksum (e.g., x3412) as its other input. Preferably, the output of this multiplexer 218 is replicated 4 times to get an 8 Byte (8 B) word. Thus, the checksum word (8 B) to be stored is either x1234123412341234 or x3412341234123412. This resultant 8 B word is stored in the packet buffer 216 at the address specified higher order bits of the checksum position. i.e. chksum_pos[n-1:3]. The byte-enables wr_be[7:0] to the packet buffer 216 are decoded (via decoder 214) from the chksum_pos[2:0]. For instance, if chksum_pos[2:0]="101", then the checksum is stored at bytes 5 & 6 of the word, i.e., the byte-enable (wr_be[7:0]) is "01100000".

By way of further clarification, checksum adder 202 preferably generates chksum_wr (and chksum_wr_again if the chksum_pos is on word boundary) after an entire packet has been received. Further, the wr_be[7:0] generated by the decoder 214 is x"01" when chksum wr again is asserted. The address of chksum write in this case is chksum_pos[n-1:3]+1. i.e. the next word in the packet.

By way of advantages, an implementation in accordance with at least one preferred embodiment of the present invention will avert the need to have 16 8:1 demultiplexers for shifting and an additional 64 2:1 multiplexers for selecting between the checksum data when it has two be written into two adjacent locations in buffers when the checksum position specified fall on a word boundary just 16 2:1 multiplexers. This reduction in logic invariably reduces the timing delays in the critical data path. The same write data word can be used to for both write cycles in case the specified checksum position straddles two words. i.e. chksum_pos=7 or 15, etc.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Method of embedding a checksum in a data packet, said method comprising the steps of:
   receiving, in a checksum adder, M-bit packet data input for a main data packet and generating, with said checksum adder, an N-bit checksum for said main data packet from one or more instances of said M-bit packet data input, wherein M=NxP, wherein P is an integer greater than one;
   replicating each bit of said N-bit checksum produced by said checksum adder P times to produce an M-bit replicated checksum;
   conveying the M-bit packet data input to a first input of a first multiplexer and conveying the M-bit replicated checksum to a second input of said first multiplexer;
   selecting with said first multiplexer one of said first input and said second input to produce an M-bit output of said first multiplexor;
   conveying the M-bit output of the first multiplexor to a packet buffer; and
   selectively writing a subset of said M-bit output containing exactly N bits to said packet buffer at a non-zero offset.

2. The method according to claim 1, wherein P equals four.

3. The method according to claim 1, wherein said step of selectively writing subsets comprises conveying a selective byte enable from a decoder.

4. The method according to claim 1, wherein said step of generating an N-bit checksum comprises adding a carry out bit to an accumulating checksum word.

5. The method according to claim 1, wherein said step of selectively writing a subset of said M-bit output of said first multiplexer to said packet buffer comprises inserting the checksum into the packet buffer at a selected one of a plurality of different offsets.

6. The method according to claim 1, wherein further comprising the step of conveying a byte-swapped checksum packet from the checksum adder to the single multiplexer.

7. The method according to claim 1, further comprising the step of writing a first portion of a first checksum to said packet buffer at a first offset in a first cycle, and writing a second portion of the first checksum to said packet buffer at a second offset in a second cycle.

8. A system for embedding a checksum in a data packet, said system comprising:
   a checksum adder receiving an M-bit packet data input for a main data packet and generating an N-bit checksum for said main data packet from one or more instances of said M-bit packet data input, wherein M=NxP, wherein P is an integer greater than one;
   a first multiplexer which selects one of two M-bit inputs to produce an M-bit output, a first input M-bit to said first multiplexer being said M-bit packet data input, and a second M-bit input to said first multiplexer being derived from said N-bit checksum by replicating each bit of said N-bit checksum P times;
   a packet buffer receiving said M-bit output of said first mutliplexer; and
   a selective write enabling mechanism for said packet buffer, said selective write enabling mechanism for selectively writing a respective subset containing exactly N bits of each of at least some instances of said M-bit output to said packet buffer at a respective non-zero offset.

9. The system according to claim 8, wherein P equals four.

10. The system according to claim 8, wherein said selective write enabling mechanism comprises a decoder producing a plurality of byte enable signals.

11. The system according to claim 8, wherein said checksum adder adds a carry out bit to an accumulating checksum word.

12. The system according to claim 8, wherein said first multiplexer and said selective write enabling mechanism are configured to insert a checksum into said packet buffer at any one of a plurality of different offsets.

13. The system according to claim 8, further comprising a second multiplexer coupled to the output of said checksum adder and producing said second input to said first multiplexer, said selective multiplexer selectively swapping the order of a plurality of disjoint subsets of said N-bit checksum.

14. The system according to claim 8, wherein said first multiplexer and said selective write enabling mechanism are configured to write a first portion of a first checksum to said packet buffer at a first offset in a first cycle, and to write a second portion of the first checksum to said packet buffer at a second offset in a second cycle.

* * * * *